United States Patent
Vincent et al.

(10) Patent No.: US 9,673,726 B2
(45) Date of Patent: Jun. 6, 2017

(54) CAPACITIVE POWER SUPPLY DEVICE FOR A CONTROL DEVICE OF AN ELECTRICAL SWITCHING APPARATUS

(71) Applicant: Schneider Electric Industries SAS, Rueil Malmaison (FR)

(72) Inventors: Francois Vincent, Le Cheylas (FR); Bruno Bordet, Saint Martin le Vinoux (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 13 days.

(21) Appl. No.: 14/953,168

(22) Filed: Nov. 27, 2015

(65) Prior Publication Data
US 2016/0190953 A1    Jun. 30, 2016

(30) Foreign Application Priority Data

Dec. 30, 2014    (FR) ...................................... 14 63424

(51) Int. Cl.
| | |
|---|---|
| H01H 9/00 | (2006.01) |
| H02M 7/04 | (2006.01) |
| H02H 1/06 | (2006.01) |
| H02H 3/24 | (2006.01) |

(52) U.S. Cl.
CPC ................ *H02M 7/04* (2013.01); *H02H 1/06* (2013.01); *H02H 3/24* (2013.01)

(58) Field of Classification Search
CPC ........ H01H 83/12; H01H 71/123; H02H 3/24; H02M 7/06; H05B 33/0845
USPC ........ 361/87, 90, 92, 111, 115, 118; 363/51, 363/54, 17, 146, 126, 128
See application file for complete search history.

(56) References Cited

U.S. PATENT DOCUMENTS

| | | | |
|---|---|---|---|
| 4,331,996 A | 5/1982 | Matsko et al. | |
| 4,890,184 A | 12/1989 | Russell | |
| 5,457,623 A * | 10/1995 | Manor ............... | H05B 41/2856 323/231 |

(Continued)

FOREIGN PATENT DOCUMENTS

EP    2 469 573 A2    6/2012

OTHER PUBLICATIONS

French Preliminary Search Report issued Sep. 17, 2015 in French Application 14 63424, filed on Dec. 30, 2014 (with English Translation of Category of Cited Documents).

*Primary Examiner* — Rajnikant Patel
(74) *Attorney, Agent, or Firm* — Oblon, McClelland, Maier & Neustadt, L.L.P.

(57) ABSTRACT

A capacitive power supply device for a control device of an electrical switching apparatus, including a power supply module that has two input terminals and a power supply voltage between the two terminals, and suitable for supplying a power supply current to a control member suitable for controlling the electrical switching apparatus when the power supply voltage is below a predetermined actuation threshold, the power supply module including a first capacitor connected at the input of voltage rectifying means, the control member being connected at the output of a rectifying block, wherein a second capacitor and a first switch, suitable for connecting the second capacitor based on a comparison of the power supply voltage to a capacitor switching threshold value.

10 Claims, 2 Drawing Sheets

(56) References Cited

U.S. PATENT DOCUMENTS

Figure 1:
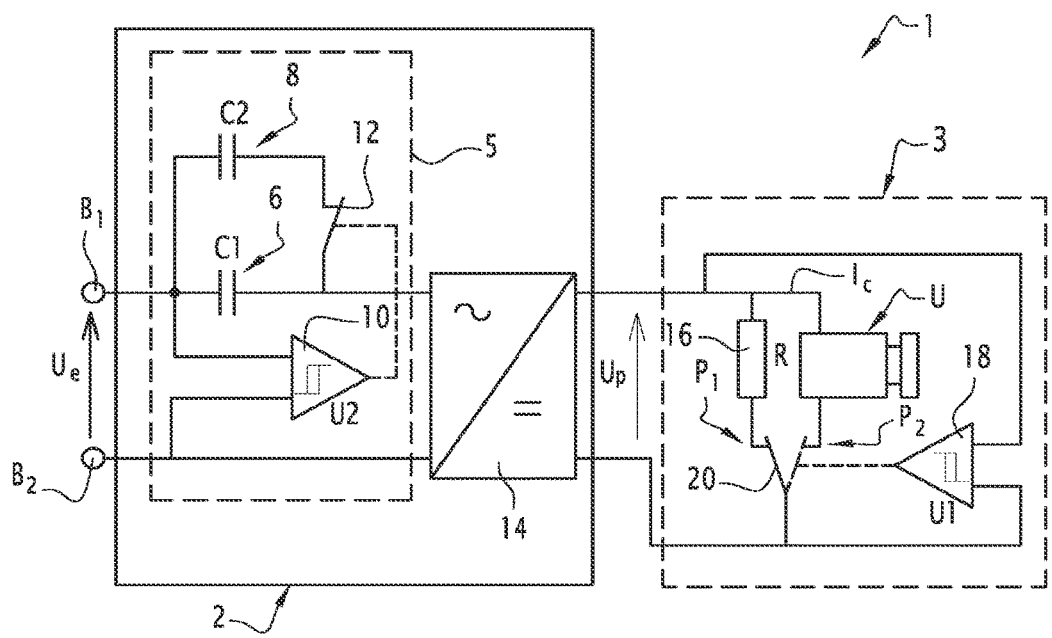

| | | | |
|---|---|---|---|
| 5,561,596 A * | 10/1996 | Hemena | H02H 3/24 |
| | | | 361/118 |
| 5,563,758 A | 10/1996 | Dembrosky et al. | |
| 5,687,066 A * | 11/1997 | Cook, II | H02H 7/1257 |
| | | | 361/91.6 |
| 6,038,149 A * | 3/2000 | Hiraoka | H02M 1/425 |
| | | | 363/37 |
| 6,836,414 B1 * | 12/2004 | Batarseh | H02M 3/33569 |
| | | | 363/132 |
| 2012/0162844 A1 | 6/2012 | Yang | |

\* cited by examiner

CAPACITIVE POWER SUPPLY DEVICE FOR A CONTROL DEVICE OF AN ELECTRICAL SWITCHING APPARATUS

This invention relates to a capacitive power supply device for a control device of an electrical switching apparatus, that has two input terminals and a power supply voltage between the two terminals, and is suitable for supplying a power supply current to a control module suitable for controlling said electrical switching apparatus when the power supply voltage is below a predetermined actuation threshold.

The invention moreover relates to an associated control device of an electrical switching apparatus.

The invention resides within the domain of electrical switching apparatus, especially of cut-off, and in particular control devices of electrical circuit breakers in the event of low voltage.

One of the problems in this domain is the creation of a control device of an electrical switching apparatus in the event of low voltage, that has a low spatial requirement in order to be suitable for installation in a small housing of a switching apparatus, such a control device being a low voltage device.

It is necessary to use a low voltage power supply device to power such a control device.

Such a control device of a switching apparatus has given functioning specifications; it must be powered by a current greater than or equal to a minimum functioning value, within a given power supply voltage range, defined by a lower bound and an upper bound, ensuring correct functioning of the control device. Functioning must furthermore be reliable and without oscillation around certain predefined thresholds. Finally, it is preferable to keep the heat dissipation in the control device below a given level in order to avoid overheating and malfunctioning of the connected switching apparatus.

The use of capacitive power supplies for powering low voltage apparatus is known, especially for domestic appliances. The advantage of such power supplies is their low cost and low spatial requirement.

However, the use of a capacitive power supply of a known type, including a capacitor connected at the input of voltage rectifying means, is not suitable for powering a control device such as described above, since the delivered current level increases with the power supply voltage. For that reason, in order to ensure the delivery of the required current level over the predefined power supply voltage range, such a classic capacitive power supply would induce too much heat dissipation in the control device for power supply voltage values close to the upper bound of the predefined power supply voltage range.

Such a capacitive power supply would therefore not allow satisfactory functioning suitable for significant variations of the power supply voltage in a wide range of voltages.

The aim of the invention is to remedy at least one of the aforementioned disadvantages of the prior art.

To that effect, the invention proposes, according to a first aspect, a capacitive power supply device for a control device of an electrical switching apparatus, comprising a power supply module that has two input terminals and a power supply voltage between the two terminals, and suitable for supplying a power supply current to a control member suitable for controlling said electrical switching apparatus when the power supply voltage is below a predetermined actuation threshold, the power supply module comprising a first capacitor connected at the input of voltage rectifying means, said control member being connected at the output of a rectifying block, characterized in that it further comprises a second capacitor and a first switch, suitable for connecting the second capacitor based on a comparison of the power supply voltage to a capacitor switching threshold value.

Advantageously, the use of a second capacitor under the control of a switch based on the power supply voltage allows an adjustment of a control voltage of the control device, and hence of the current level supplied to the control device, allowing it to be made to function to control the switching apparatus while limiting heat dissipation.

The capacitive power supply device for a control device of an electrical switching apparatus according to the invention can also present one or more of the following characteristics:

- the capacitance values of said first and second capacitors and the capacitor switching threshold value are determined such that the power supply current supplied to the control member is neither below a minimum current value, nor above a maximum current value as long as the power supply voltage is contained between a lower bound and an upper bound of a predetermined functioning voltage range;
- the maximum current value corresponds to a heat dissipation in the control member below or equal to a predetermined heat dissipation level;
- said control member is part of a control module, the control member having an associated resistance value, the control module further comprising a resistive element mounted at the output of the rectifying block, and a second switch suitable for performing switching between the connection of said resistive element and the connection of the control member at the output of the rectifying block, said resistive element having a resistance value below the resistance value of said control member;
- the second switch switches between the connection of said resistive element and the connection of said control member when the voltage at the output of the rectifying block exceeds a control switching threshold corresponding to a power supply voltage substantially equal to the predetermined actuation threshold;
- the resistance value of the resistive element is selected on the basis of the resistance value of the control member so as to ensure a predetermined hysteresis value of the second switch;
- the capacitance value of the first capacitor is determined such that, when only the first capacitor is connected in the power supply module, the power supply current supplied to the control member is equal to the maximum current value when the power supply voltage is equal to said upper voltage bound;
- the capacitance value of the second capacitor is determined such that, when said first and second capacitors are connected in the power supply module, the current level supplied to the control member is at least equal to the minimum current value when the power supply voltage is equal to the lower voltage bound;
- the capacitor switching threshold value and an associated hysteresis value are determined on the basis of a power supply voltage value at which the power supply current supplied to the control member reaches the maximum current value, when said first and second capacitors are connected in the capacitive power supply module, and on the basis of a power supply voltage value at which the power supply current supplied to the control member reaches the minimum current value, when only said first capacitor is connected in the capacitive power supply module.

According to a second aspect, the invention relates to a control device of an electrical switching apparatus including a capacitive power supply device according to the first aspect of the invention, suitable for controlling said electrical switching apparatus when the power supply voltage is below a predetermined actuation threshold.

Figure 2:
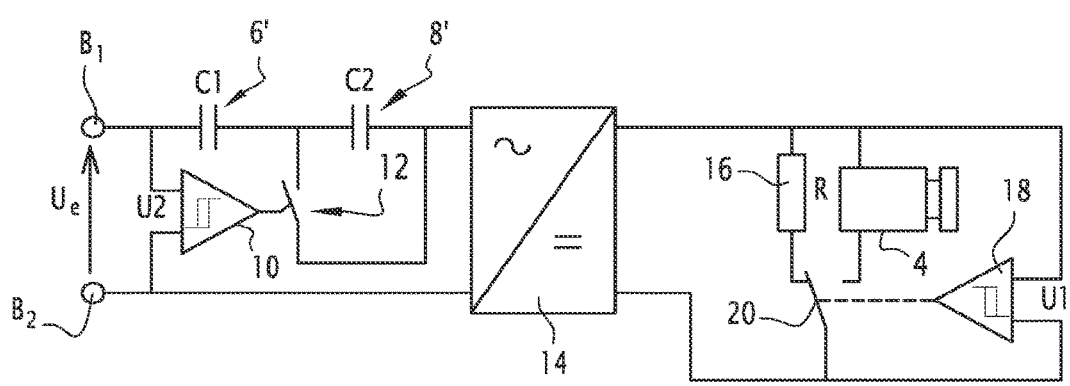
Figure 3:
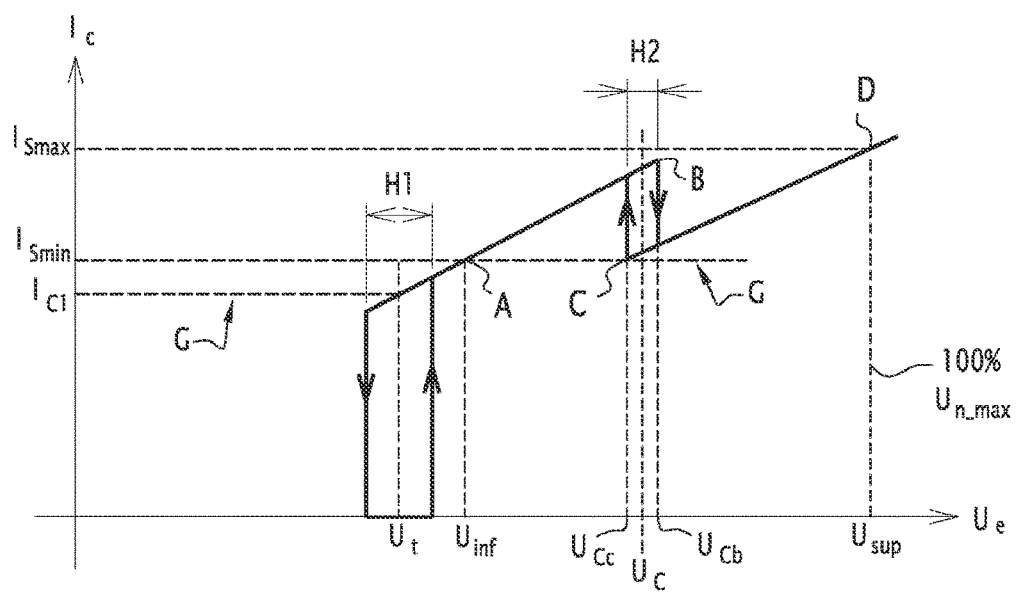

Other characteristics and advantages of the invention will emerge from the description that is given below, as an indication and in no way limitative, with reference to the attached figures, among which:

FIG. 1 diagrammatically illustrates a control device of an electrical switching apparatus according to a first embodiment of the invention;

FIG. 2 diagrammatically illustrates a control device of an electrical switching apparatus according to a second embodiment of the invention;

FIG. 3 diagrammatically illustrates a change diagram of the power supply current of a control member according to the invention.

FIG. 1 diagrammatically illustrates a control device 1 of an electrical switching apparatus, this apparatus not being shown. For example, such an electrical switching apparatus is a circuit breaker.

The control device 1 of an electrical switching apparatus is a control device called "low voltage", which causes a cut-off when the power supply voltage $U_e$ taken between the terminals $B_1$ and $B_2$ drops below a given actuation threshold $U_t$, which is preferably expressed as a percentage of a given nominal voltage $U_n$.

The power supply voltage $U_e$ in this example is the voltage of an electrical network, for example a three-phase network.

For example, according to a given gauge, the nominal voltage $U_n$ is contained between a minimum nominal voltage $U_{n\_min}$ and a maximum nominal voltage $U_{n\_max}$, the actuation threshold $U_t$ is $0.7 \times U_{n\_min}$, hence the actuation threshold is reached when the power supply voltage reaches 70% of the minimum nominal voltage.

For example, $U_{n\_min} = 220$ V (Volts) and $U_{n\_max} = 240$ V, and hence $U_t = 154$ V.

The switching control device 1 includes a power supply module 2 and a control module 3, including a control member 4, which is preferably a coil actuator. The control member 4 is powered by a power supply current $I_c$, typically contained between 7 to 10 mA (milliamps). When the power supply current $I_c$ is above a minimum current value, also called the given holding value $I_{s\text{-}min}$, the control member 4 is reset and shutting down of the switching apparatus is authorized. Conversely, when the power supply current $I_c$ is below the minimum current value $I_{s\text{-}min}$, the control member 4 triggers controlling of the switching apparatus.

The power supply module 2 includes a capacitive input block 5, including a first capacitor 6, having capacitance $C_1$, and a second capacitor 8, having capacitance $C_2$, mounted in parallel with the first capacitor 6 according to the first embodiment illustrated in FIG. 1.

The capacitive input block 5 further includes a first voltage comparator 10, connected between the power supply terminals $B_1$ and $B_2$, and a first switch 12, suitable for switching between a closed position, allowing switching of the second capacitor 8 in the power supply module 2, and an open position, allowing disconnection of the second capacitor 8 from the power supply module 2.

The first switch 12 is controlled by the output of the first voltage comparator 10, suitable for comparing the power supply voltage $U_e$ to a capacitor switching threshold voltage $U_c$.

The voltage $U_c$ of the capacitor switching threshold is determined, in relation to the capacitance values $C_1$ and $C_2$, so as to hold the power supply current $I_c$ supplied to the control member 4 below a predetermined threshold of the maximum current $I_{s\text{-}max}$, as explained in greater detail below.

Thus, advantageously, the functioning gauge of the electrical switching control device is respected, and the power dissipated in the control member 4 is below a predetermined heat limit, equal, for example, to 1.1 Watt.

It should be noted that the first voltage comparator 10 is diagrammatically illustrated, and includes, in a classic way, variable resistors and a positive peak detector allowing the comparison voltage $U_c$ to be adjusted on the basis of the reference voltage U2 of the first voltage comparator 10. In fact, in a known way, a voltage comparator has an inherent reference voltage and an associated hysteresis value $H_2$.

The outputs of the capacitive input block 5 are connected to a full-wave rectifying block 14, the outputs constituting, for example, a bridge of diodes. The rectifying block 14 incorporates, in a classic way, filtering provided by means of a capacitor.

The output terminals of the rectifying block 14 power the control module 3 with direct current. The voltage at the output of the rectifying block 14 is marked voltage $U_p$.

The control module 3 further includes a resistive element 16 that has a resistance R, a second voltage comparator 18 and a second switch 20.

The second switch 20 is suitable for switching between a first position $P_1$ in which the resistive element 16 is connected at the output of the rectifying block 14, and a second position $P_2$, in which the control member 4 is connected at the output of the rectifying block 14, the resistive element 16 being disconnected.

The switching between the position $P_1$ and the position $P_2$ of the second switch 20 is controlled by the output of the second voltage comparator 18.

The second voltage comparator 18 is capable of comparing the voltage $U_p$ at the output of the rectifying block 14 to a control switching threshold voltage $U_s$.

The control switching threshold voltage $U_s$ is fixed on the basis of the power supply voltage $U_e$. Preferably, the control switching threshold voltage $U_s$ is such that the power supply voltage $U_e$ is equal to the actuating threshold $U_t = 0.7 \times U_{n\_min}$.

It should be noted that the second voltage comparator 18 is diagrammatically illustrated, and includes, in a classic way, variable resistors allowing the comparison voltage $U_s$ to be adjusted on the basis of the reference voltage $U_1$ of the second voltage comparator 18. In fact, in a known way, a voltage comparator has an inherent reference voltage and an associated hysteresis value $H_1$.

Advantageously, the resistance value R is chosen below the resistance R' of the control member 4. For example, for a control member 4 with coil, the resistance R' is the resistance of the coil when cold, at a temperature of less than 25° C.

Since the resistance R is below the resistance R' of the control member 4, the current consumed by the resistive element 16 is greater, causing a decrease of the voltage $U_p$ at the output of the rectifying block 14. This produces a hysteresis effect $H_1$, which prevents oscillations of the second switch 20 if the power supply voltage $U_e$ stabilizes around the voltage $U_t$.

For example, the use of a resistance R 5% below the resistance R' of the control member 4 allows the functioning of the control device to be made reliable. This difference will allow a minimum hysteresis $H_1$ of 10% to be guaranteed at the reference temperature of 25° C.

In a second embodiment, illustrated in FIG. 2, the power supply module includes two capacitors 6', 8' mounted in series and not in parallel. In this second embodiment, the first switch 12 is in the "open" position when the power supply voltage $U_e$ is below the capacitor switching threshold voltage $U_c$, and in the "closed" position when the power supply voltage is above $U_c$.

FIG. 3 diagrammatically illustrates the change diagram of the power supply current $I_c$ of the control member 4 based on the power supply voltage $U_e$, depending on changes in rising or falling power supply voltage, as indicated by the arrows shown.

The difference between functioning with rising voltage and functioning with falling voltage is due to the existence of hysteresis $H_2$ in the power supply module 2 and hysteresis $H_1$ in the control module 3.

When the power supply voltage $U_e$ increases from the value 0V to the actuating threshold $U_t=0.70 \times U_{n\_min}$, the first switch 12 is in the closed position, the second capacitor 8 is connected, whereas the second switch 20 is in the position $P_1$, the control member 4 is not powered.

When the power supply voltage reaches a first voltage threshold $U_{inf}$ above or equal to the actuating threshold $U_t$, the voltage $U_p$ at the output of the rectifying block 14 reaches the control switching threshold voltage $U_s$, the second switch 20 switches to the position $P_2$, the power supply current $I_c$ goes to a value $I_{c1}$.

When the power supply voltage reaches the voltage value equal to the lower bound $U_{inf}$ of the voltage range ensuring the correct operation of the control member 4, the power supply current $I_c$ equals current minimum value $I_{s-min}$, this current level allowing resetting of the control member 4 and closing of the circuit breaker connected downstream.

In the illustrated embodiment, $U_{inf}=0.85 \times U_{n\_min}$, this value being predefined according to a correct functioning gauge of the control member 4.

On FIG. 3, the correct functioning gauge G of the control member 4 is shown as dotted lines. The gauge G includes in particular four correct functioning points, marked A, B, C and D on the figure, which will make it possible to determine the capacitance values $C_1$, $C_2$ of the capacitor switching threshold value $U_c$ and hysteresis $H_2$.

When the power supply voltage reaches the capacitor switching threshold value $U_c$, the first switch 12 goes to the open position, only the first capacitor 6 remaining in the power supply module 2. The effect of this change is to reduce the voltage at the output of the rectifying block 14, to a level such that the control module is powered by a current equal to the minimum current value $I_{s-min}$.

The level of the current powering the control module 4 does not exceed the maximum current value $I_{s-max}$, corresponding to the maximum heat dissipation authorized in the control member, at the maximum power supply voltage provided in the functioning gauge, equal to the upper bound $U_{sup}$ of the voltage range ensuring correct functioning of the control member 4 (point D of the gauge of FIG. 3).

For example, $U_{sup}=1.1 \times U_{n\_max}$.

The maximum current value $I_{s-max}$ is such that the heat dissipation in the control member 4 is below or equal to a given value, for example 1.1 Watt. The maximum current value $I_{s-max}$ is therefore selected on the basis of a maximum thermal strain.

In order to create the functioning illustrated in FIG. 3, the capacitance $C_1$ is selected so that the power supply current $I_c$ supplied to the control member 4, when only the first capacitor 6 with capacitance $C_1$ is present in the power supply module, is equal to $I_{s-max}$ at the maximum power supply voltage $U_{sup}$ provided in the functioning gauge (point D of the gauge of FIG. 3).

The capacitance $C_2$ is selected such that, when the two capacitors 6 and 8 are connected in parallel in the power supply module 2, the current level $I_c$ supplied to the control member 4 is at least equal to the minimum current value $I_{s-min}$ when the power supply voltage is equal to the lower voltage bound $U_{inf}$ of the correct functioning range (point A of the gauge of FIG. 3).

The capacitor switching threshold voltage $U_c$ is determined as being the power supply voltage value such that the power supply current supplied to the control module reaches the maximum current value $I_{s-max}$ when the two capacitors are connected in the power supply module (point B of the gauge of FIG. 3). The capacitor switching threshold value $U_c$ is calculated taking account of point C of the gauge of FIG. 3, which ensures that the current $I_c$ supplied to the control module does not fall below the minimum holding current value $I_{s-min}$ as long as the power supply voltage $U_e$ is above $U_{inf}$. The hysteresis value $H_2$ of the first voltage comparator 10 is likewise calculated on the basis of the voltages $U_{cc}$ at point C of the gauge and $U_{cb}$ at point B of the gauge.

For example, an embodiment of the calculation of the capacitance values $C_1$, $C_2$ on the basis of points A and D of the gauge G, and of the capacitor switching threshold voltage value $U_c$ and hysteresis value $H_2$ on the basis of points B and C of the gauge G is described below.

The approach used is a simplified approach.

It is considered that the power supply module has an impedance $Z_2$ and that the control module has an impedance $Z_4$.

The impedance $Z_2$ of the power supply module is mostly capacitive, equal to $C_1+C_2$ when the voltage $U_e$ is below $U_c$ and equal to $C_1$ when the voltage $U_e$ is above $U_c$.

The impedance $Z_4$ of the control module consists mostly of the resistance R.

The current $I_c$ in the control member 4 is given by the relation:

$$|I_c| = \frac{|U_e|}{|Z_4| + |Z_2|} \quad (1)$$

Noting that:

$$|Z_t| = |Z_4| + |Z_2| \quad (2)$$

The relation (1) is written:

$$|I_c| = \frac{|U_e|}{|Z_t|} \quad (3)$$

and:

$$\|Z_t\| = \sqrt{R^2 + \frac{1}{C_T^2 \omega^2}} \quad (4)$$

Where $C_T$ represents the equivalent capacitance of the switching control device 1 and $\omega$ the pulsation of the power supply voltage $U_e$.

The value $C_T$ depends on the position of the first switch 12, which depends on the value of the power supply voltage $U_e$.

When the power supply voltage $U_e$ is below $U_c$, then the first switch 12 is closed and $C_T=C_1+C_2$.

When the power supply voltage $U_e$ is above $U_c$, then the first switch 12 is open and $C_T=C_1$.

By combining the relations (3) and (4) we obtain:

$$C_T = \sqrt{\frac{1}{\left(\frac{U_e^2}{I_C^2} - R^2\right)\omega^2}} \quad (5)$$

and $$U_e = \sqrt{R^2 + \frac{I_C^2}{C_T^2 \omega^2}} \quad (6)$$

The relation (5) is used to determine $C_1$ and $C_2$ through successive upper and lower bounds of functioning points A and D of the gauge G.

At functioning point A, one has $U_e=U_{inf}$, which is below $U_c$, consequently the first switch 12 is closed, hence $C_T=C_1+C_2$. It follows that:

$$C_1 + C_2 = \sqrt{\frac{1}{\left(\frac{U_{inf}^2}{I_{s-min}^2} - R^2\right)\omega^2}} \quad (7)$$

At functioning point D, $U_e=U_{sup}$, which is above $U_c$, hence the first switch 12 is open, $C_T=C_1$ and it follows that:

$$C_1 = \sqrt{\frac{1}{\left(\frac{U_{sup}^2}{I_{s-max}^2} - R^2\right)\omega^2}} \quad (8)$$

The relation (8) allows $C_1$ to be determined, and $C_2$ is then obtained from the relation (7), by subtracting the value of $C_1$, previously calculated.

After calculating the capacitance values $C_1$ and $C_2$, the relation (6) is used to determine the capacitor switching threshold voltage $U_c$ and the maximum hysteresis $H_2$ admissible for respecting the functioning criteria at $I_c$: $I_{s-min} \leq I_c \leq I_{s-max}$, corresponding to functioning points B and C of the gauge G.

At functioning point B, the voltage $U_{cb}$, above which the current $I_c$ is above the maximum current value $I_{s-max}$, is determined by the relation (6), in which $C_T=C_1+C_2$, since the first switch 12 is closed:

$$U_{cb} = \sqrt{R^2 + \frac{I_{s\,max}^2}{(C_1+C_2)^2 \omega^2}} \quad (9)$$

At functioning point C, the voltage $U_{cc}$, below which the current $I_c$ is below the minimum current value $I_{s-min}$, is determined by the relation (6), in which $C_T=C_1$, since the first switch 12 is open:

$$U_{cc} = \sqrt{R^2 + \frac{I_{s-min}^2}{C_1^2 \omega^2}} \quad (10)$$

Subsequently, after calculating the values $U_{cb}$ and $U_{cc}$, we determine:

$$U_c = \frac{U_{cc} + U_{cb}}{2} \quad (11)$$

and $$H_2 = U_{cb} - U_{cc} \quad (12)$$

In a digital example, in no way limitative, if $I_{s-min}=7$ mA and $I_{s-max}=10$ mA, $U_{inf}=176$V, $U_{sup}=305$V, $R=5500\Omega$ (Ohms) and f=50 Hz (Hertz) with $\omega=2\pi f$, we obtain: $C_1=106$ nF (nano-Farads), $C_2=29$ nF, $U_c=240$V and $H_2=34.9$V The device 1 is thus calibrated so that the power supply current of the control member 4 respects the functioning conditions supplied by the predetermined gauge G, while not exceeding a maximum current value $I_{s-max}$ so as further to ensure a limitation of the heat dissipation to a predetermined level.

The power supply module 2 of the device 1 has a low manufacturing cost and presents a low spatial requirement.

The invention claimed is:

1. A capacitive power supply device for a control device of an electrical switching apparatus, comprising a power supply module that has two input terminals and a power supply voltage between the two terminals, and suitable for supplying a power supply current to a control member suitable for controlling said electrical switching apparatus when the power supply voltage is below a predetermined actuation threshold, the power supply module comprising a first capacitor connected at the input of a voltage rectifying block, said control member being connected at the output of the rectifying block,
wherein a second capacitor and a first switch, suitable for connecting the second capacitor based on a comparison of the power supply voltage to a capacitor switching threshold value.

2. The capacitive power supply device according to claim 1, wherein the capacitance values of said first and second capacitors and the capacitor switching threshold value are determined such that the power supply current supplied to the control member is neither below a minimum current value, nor above a maximum current value as long as the power supply voltage is contained between a lower bound and an upper bound of a predetermined functioning voltage range.

3. The capacitive power supply device according to claim 1, wherein a maximum current value supplied to the control member corresponds to a heat dissipation in the control member below or equal to a predetermined heat dissipation level.

4. The capacitive power supply device according to claim 1, wherein said control member is part of a control module, the control member having an associated resistance value, the control module further comprising a resistive element mounted at the output of the rectifying block, and a second switch suitable for performing switching between the connection of said resistive element and the connection of the control member at the output of the rectifying block, said resistive element having a resistance value below the resistance value of said control member.

5. The capacitive power supply device according to claim 4, wherein the second switch switches between the connection of said resistive element and the connection of said control member when the voltage at the output of the rectifying block exceeds a control switching threshold corresponding to the power supply voltage substantially equal to the predetermined actuation threshold.

6. The capacitive power supply device according to claim 4, wherein the resistance value of the resistive element is selected on the basis of the resistance value of the control member so as to ensure a predetermined hysteresis value of the second switch.

7. The capacitive power supply device according to claim 2, wherein the capacitance value of the first capacitor is determined such that, when only the first capacitor is connected in the power supply module, the power supply current supplied to the control member is equal to the maximum current value when the power supply voltage is equal to said upper voltage bound.

8. The capacitive power supply device according to claim 7, wherein the capacitance value of the second capacitor is determined such that, when said first and second capacitors are connected in the power supply module, the current level supplied to the control member is at least equal to the minimum current value when the power supply voltage is equal to the lower voltage bound.

9. The capacitive power supply device according to claim 7, wherein the capacitor switching threshold value and an associated hysteresis value are determined on the basis of a power supply voltage value at which the power supply current supplied to the control member reaches the maximum current value, when said first and second capacitors are connected in the capacitive power supply module, and on the basis of a power supply voltage value at which the power supply current supplied to the control member reaches the minimum current value, when only said first capacitor is connected in the capacitive power supply module.

10. A control device of an electrical switching apparatus, comprising a capacitive power supply device according to claim 1, suitable for controlling said electrical switching apparatus when the power supply voltage is below a predetermined actuation threshold.

* * * * *